US009128588B2

(12) United States Patent  
Charif et al.

(10) Patent No.: US 9,128,588 B2  
(45) Date of Patent: Sep. 8, 2015

(54) ASSISTED SERVICE REGISTRATION FACILITATING BUSINESS PROCESS SERVICE REUSE

(75) Inventors: Yasmine Charif, Rochester, NY (US); Andrés Quiroz Hernandez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 545 days.

(21) Appl. No.: 13/493,608

(22) Filed: Jun. 11, 2012

(65) Prior Publication Data

US 2013/0332887 A1  Dec. 12, 2013

(51) Int. Cl.
- G06F 3/048 (2013.01)
- G06F 9/44 (2006.01)
- G06F 3/0482 (2013.01)

(52) U.S. Cl.
CPC .................................. *G06F 3/0482* (2013.01)

(58) Field of Classification Search
CPC ....................................................... G06F 3/048
USPC .......................................................... 715/841
See application file for complete search history.

(56) References Cited

U.S. PATENT DOCUMENTS

| 6,032,004 | A | 2/2000 | Mirabella, Jr. et al. |
| 7,552,170 | B2 | 6/2009 | Owen et al. |
| 7,596,622 | B2 | 9/2009 | Owen et al. |
| 7,630,965 | B1 * | 12/2009 | Erickson et al. ........................ 1/1 |
| 7,966,320 | B2 | 6/2011 | Roshen |
| 8,024,397 | B1 | 9/2011 | Erickson et al. |
| 2003/0103232 | A1 | 6/2003 | Twede |
| 2005/0028073 | A1 | 2/2005 | Henry et al. |
| 2005/0080768 | A1 | 4/2005 | Zhang et al. |
| 2007/0116013 | A1 | 5/2007 | Brown et al. |

(Continued)

FOREIGN PATENT DOCUMENTS

JP  2009184028  8/2009

OTHER PUBLICATIONS

Preeda Rajasekaran et al. "Enhancing Web Services Description and Discovery to Facilitate Composition" (Book Title: Semantic Web Services and Web Process Composition, Book Subtitle: First International Workshop SWSWPC 2004, Dan Diego, CA, USA, Jul. 6, 2004, Series Title: Lecture Notes in Computer Science vol. 3387, pp. 55-68).*

(Continued)

*Primary Examiner* — Jennifer To  
*Assistant Examiner* — Xuyang Xia  
(74) *Attorney, Agent, or Firm* — Gibb & Riley, LLC

(57) ABSTRACT

Methods and systems receive a service name, a service description, and/or operational steps of a service being registered. A first menu of previously established service class choices is provided in ranked order based on the service name, service description, and/or operational steps. Similarly, second and third menus of previously established class input/output mappings to inputs and outputs (required and produced by the operational steps of the service being registered) is presented in a ranked order, based on similar input/outputs of the selected service class. A fourth menu of previously established class transformations is provided in ranked order based on the similarity of inputs and outputs required for the operational steps of the service being registered, and inputs and outputs of the selected service class. The service is registered based on the selected service class, the selected class input mappings, the selected class output mappings, and the selected transformations.

20 Claims, 16 Drawing Sheets

(56) References Cited

U.S. PATENT DOCUMENTS

| | | | |
|---|---|---|---|
| 2008/0147453 A1 | 6/2008 | Kogan et al. | |
| 2008/0281904 A1* | 11/2008 | Conrad et al. | 709/203 |
| 2008/0289012 A1* | 11/2008 | Shi et al. | 726/4 |
| 2009/0249338 A1 | 10/2009 | Beg | |
| 2009/0254401 A1 | 10/2009 | Blanchard | |
| 2010/0153167 A1 | 6/2010 | Kretzschumar et al. | |

OTHER PUBLICATIONS

U.S. Appl. No. 13/192,704, filed Jul. 28, 2011, Liu et al.
Business Process Management (BPM): The Third Wave, P. Smith and H. Fingar, ISBN 0-929652-33-9 Off-press, Nov. 2002, Meghan-Kiffer Press. Preface.
Business Process Model and Notation (BPMN), OMG, http://www.omg.org/spec/BPMN/2.0, Jan. 2011, pp. 1-29.
Magic Quadrant for Business Process, Gartner Report, http://imagesrv.gartner.com/media-products/pdf/reprints/ibm/external/volume5/article4.pdf, Feb. 2010, pp. 1-15.
http://netbeans.org/ p. 1, Jan. 19, 2012.
M. Salatino. jBPM Developer Guide. Packt Publishing, http://docs.jboss.com/jbpm/v4/deveguide/html_single, pp. 1-5, 2009.
Van der Aalst. Business Process Management: A Survey, Department of Technology Management Eindhoven University of Technology, 2002, 12 pages.
D. Blei, A. Ng, and M. Jordan. Latent Dirichlet Allocation. Journal of Machine Learning Research, 3:993-1022, Jan. 2003.
C. Corley, R. Mihalcea. Measuring the Semantic Similarity of Texts. Proceedings of the ACL Workshop on Empirical Modeling of Semantic Equivalence and Entailment, pp. 13-18, 2005.
N. Seco, T. Veale, J. Hayes. An Intrinsic Information Content Metric for Semantic Similarity in WordNet. Proceedings of the European Conference on Artificial Intelligence, 2004.
T. Cheng, H. W. Lauw, S. Paparizos. Fuzzy matching of Web queries to structured data. Proceedings of the International Conference on Data Engineering, IEEE Computer Society, Abstract, 2010.
U.S. Appl. No. 13/360,829, filed Jan. 30, 2012.

* cited by examiner

ASSISTED SERVICE REGISTRATION FACILITATING BUSINESS PROCESS SERVICE REUSE

BACKGROUND

Embodiments herein generally relate to workflows and services and more particularly to presenting service providers with an intuitive and natural system and method for registering their service in a way that easily creates a service database entry and that processes the service being registered into existing classification structures.

Business Process Management Systems (BPMS) are an essential part of modern businesses as they attempt to streamline and automate as much as possible the complex workflows and interactions between human and software systems. BPM encompasses a wide range of activities, from abstracting processes or process requirements into service and workflow definitions, to translating those abstract definitions into formal process descriptions, to eventually concretizing and executing those processes within a framework that supports their orchestration.

BPMS allow orchestrating services into workflows that achieve business transactions. In order to reuse workflow definitions, for example for multiple domains within an organization, current business process design platforms either do not require any effort from the provider to configure their services or they require services to be developed or adapted specifically to meet the functional and reusability needs of a business process.

Business process design platforms allow orchestrating services into workflows that achieve business transactions. There are processes, e.g. document workflows, that are applicable in multiple domains within an organization, but this requires the reuse of workflow definitions which currently implies either the adaptation of individual services, or the manual selection of alternative services suited to each domain.

Specifically, from a workflow reusability point of view, the current business process design platforms fall under one of the two following categories. In the first category are platforms that do not require any effort from the provider to configure their services to the needs of a particular business process, e.g. allowing importing WSDL interfaces of the services to be orchestrated and automatically generating stubs for service invocation. As a consequence, the services and the bindings within a workflow definition must be changed for each application of the workflow. In the second category are platforms where services must be developed or adapted specifically to meet the functional and reusability needs of a business process require defining Java services and wrappers to enable the engine to interact with the services. This puts an extra burden on the service provider.

SUMMARY

Exemplary methods and systems herein register and maintain service operations provided by service providers. Such methods and systems receive, into a computerized device, a service name, a service description, and/or operational steps of a service being registered. The methods and systems herein automatically provide, from the computerized device, a first menu of previously established service class choices in a ranked order based on the service name, service description, and/or operational steps. In response, the methods and systems herein receive, into the computerized device, a selected service class from the first menu for the service being registered.

The methods and systems herein also automatically provide, from the computerized device, a second menu of previously established class input mappings to user inputs, such user inputs being required for the operational steps of the service being registered. The second menu is also presented in a ranked order, based on similar input mappings of the selected service class. The methods and systems herein then receive, into the computerized device, selected class input mappings from the second menu for the service being registered.

The methods and systems herein also automatically provide, from the computerized device, a third menu of previously established class output mappings to outputs produced by the operational steps. The third menu is presented again in a ranked order, based on similar output mappings of the selected service class. In addition, such systems and methods receive, into the computerized device, selected class output mappings from the third menu for the service being registered.

The methods and systems herein automatically provide, from the computerized device, a fourth menu of previously established class transformations in a ranked order based on the similarity of inputs and outputs required for the operational steps of the service being registered, and inputs and outputs of the selected service class. The methods and systems herein in turn receive, into the computerized device, selected transformations from the fourth menu for the service being registered. Such methods and systems then register the service based on the selected service class, the selected class input mappings, the selected class output mappings, and the selected transformations.

Others of such methods and systems automatically provide a service registration interface to the service provider using a graphic user interface of a computerized device. The methods and systems herein automatically provide a service name field on the service registration interface into which the service provider inputs a service name of a service being registered, and automatically provide a service description field on the service registration interface into which the service provider inputs a service description of the service being registered.

The methods and systems herein also automatically provide a plurality of service operation fields on the service registration interface. The service operation fields have a drop down menu of previously established operation choices from which the service provider chooses operational steps of the service being registered, and can provide a field to allow the service provider to manually input the operational steps of the service being registered.

Such methods and systems rank, using the computerized device, service class choices from previously established service classes into a first ranked order. The first ranked order is based on similarities between the service name, the service description, and/or the operational steps of the service being registered, and corresponding names, descriptions, and operational steps of the previously established service classes. The process of ranking of the service class choices comprises evaluating semantic distances between the service name, the service description, and the operational steps of the service being registered and the corresponding names, descriptions, and operational steps of the previously established service classes.

With such, the methods and systems herein automatically provide a service class field on the service registration interface that has a drop down menu of the service class choices presented in the first ranked order (from which the service provider chooses a selected service class for the service being registered). The methods and systems herein automatically can also provide a class description when automatically providing the drop down menu of the service class choices. The service class field can also provide a field to allow the service provider to manually input the selected service class for the service being registered.

The methods and systems herein additionally rank, using the computerized device, previously established class inputs into a second ranked order based on a similarly between user inputs (items required from users during the operational steps of the service being registered) and previously established inputs required by previously established services in the selected service class. The methods and systems herein automatically provide a plurality of input mapping fields on the service registration interface for each of the user inputs. The input mapping fields have a drop down menu of the previously established class inputs to be mapped to the user inputs presented in the second ranked order (from which the service provider chooses selected class input mappings). The input mapping fields can also include fields for manually entering the selected class input mappings.

Further, the methods and systems herein rank, using the computerized device, previously established class outputs into a third ranked order based on a similarly between service outputs of the service being registered (produced during the operational steps) and previously established outputs produced by the previously established services in the selected service class. The methods and systems herein automatically provide a plurality of output mapping fields on the service registration interface for each of the service outputs. The output mapping fields have a drop down menu of the previously established class outputs to be mapped to the service outputs of the service being registered, that are presented in the third ranked order (from which the service provider chooses selected class output mappings).

Also, the methods and systems herein rank, using the computerized device, previously established class transformations into a fourth ranked order based on a similarly between the service inputs and the service outputs of the service being registered, and the previously established inputs and the previously established outputs for the selected class. The methods and systems herein automatically provide a transformation function field on the service registration interface. The transformation function field has a drop down menu of the previously established class transformations in the fourth ranked order (from which the service provider chooses selected transformations) and has a field for manually entering the selected transformations.

The methods and systems herein register, using the computerized device, the service based on the selected service class, the selected class input mappings, the selected class output mappings, and the selected transformations. Further, the methods and systems herein populate, using the computerized device, a service database entry with the service name, the service description, the operational steps, the selected service class, the instructions to map inputs, the instructions to map transformation outputs, the transformation inputs, and the transformation outputs. The methods and systems herein also generate, using the computerized device, a wrapper based on the service database entry. The wrapper maintains information from the service database entry in a format used by a business process execution engine.

The methods and systems herein can also automatically provide an option indication field on the service registration interface. The option indication field identifies ones of the operational steps, the user inputs, the transformation inputs, and the transformation outputs that are optional in the service being registered.

The methods and systems herein expand the previously established service classes when the service provider manually inputs the selected service class for the service being registered, expand the previously established class inputs when the service provider manually enters instructions to map the user inputs to internal operational outputs of the service being registered, and expand the previously established class transformations when the service provider manually enters transformations of the service being registered.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, platforms that do not require any effort from the provider to configure their services to the needs of a particular business process, and platforms where services must be developed or adapted specifically to meet the functional and reusability needs of a business process require defining Java services and wrappers to enable the engine to interact with the services, and this put an extra burden on the service provider.

The systems and methods herein facilitate the automatic reusability of service workflows by managing a set of generic classes for services, henceforth referred to simply as classes, and generic data types, and providing assistance to service providers to map their services to these classes. The service provider is presented with an interface where they register their service. The registration includes the selection of a class from a list of available classes which are ranked by the system according to the likelihood of a match of the service to the class, and the selection of the appropriate (input/output) parameters of the selected class to map the parameters of the service. This selection is also made from lists of parameters that are ranked by the system according to the likelihood of a match of the service parameter to the class parameter or internal operation parameter.

A possible extension of the available classes and/or their parameters, is available if there is no appropriate class match. The service registration leads to the automatic generation of wrapper code for services that enables their execution by a business process engine, and their reuse in multiple workflows because of the class interface. The ranking of the class and parameter suggestions for particular services in the registration stage is obtained, respectively, by applying the similarity calculation method and the heuristics are described herein.

1.0 General 1.1 The systems and methods herein address the issue of making services reusable by managing a set of generic service classes and generic data types, and providing assistance to service providers to map their services to these classes, and obtain automatically generated wrapper code.

1.2 Notational Conventions

This disclosure works in the context of business process workflows, although the systems and methods herein are in principle generally applicable to other types of workflows. Consequently the terms workflow and business process are used interchangeably. Classes are generic service types maintained by the platform to group sets of services. A registered service is distinguished from the code base of the service. While the service code base is a set of operations and their implementation (a web service in the traditional sense), a registered service is referred to simply as service, and is an operation or an orchestration of operations from this code base.

1.3 Service Registration Functioning

Figure 1:
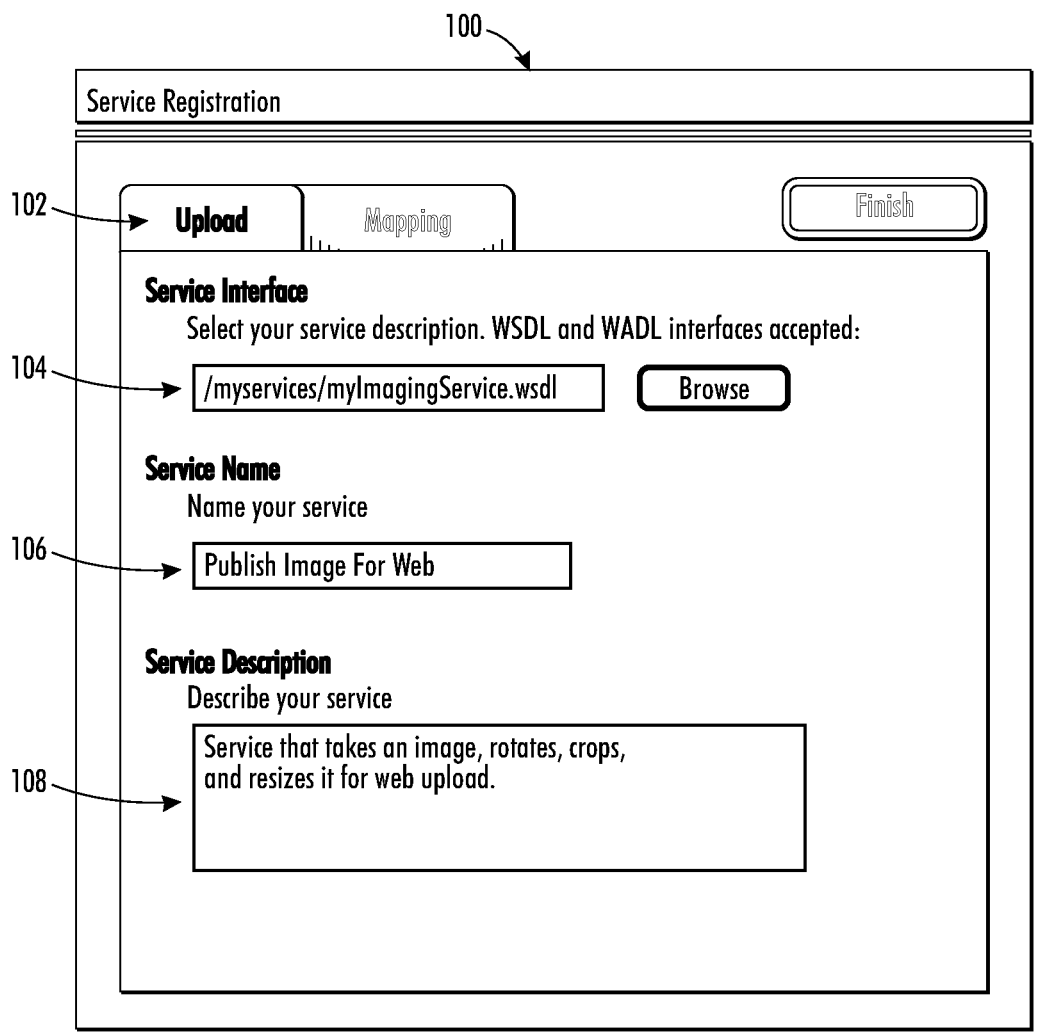
FIG. 1 is a schematic diagram of a screenshot according to embodiments herein.

The systems and methods herein approach the issue of service registration by an interactive mechanism enabled by a smart user interface 100, which is illustrated in FIGS. 1-5. A service provider may, for example, want to register a custom service for sizing images for the web that also embeds user information. In FIG. 1, the service provider chooses the upload tab 102 to upload the code base interface, e.g. WSDL document 104, to define the custom service through the registration interface. As shown in FIG. 1, the service provider first has to upload the WSDL document, to name 106, and to describe his/her service 108. Doing this results in a number of fields corresponding to the class of the service, its operations, and its inputs and outputs being pre-populated (as shown in FIGS. 2-5). In the case that the WSDL document contains only one service operation along with descriptive metadata for this operation, the name 106 and description 108 fields in the registration interface 100 are automatically filled out using this metadata. The service provider may override any selection made by the system by choosing an item from the corresponding drop-down box.

Figure 2:
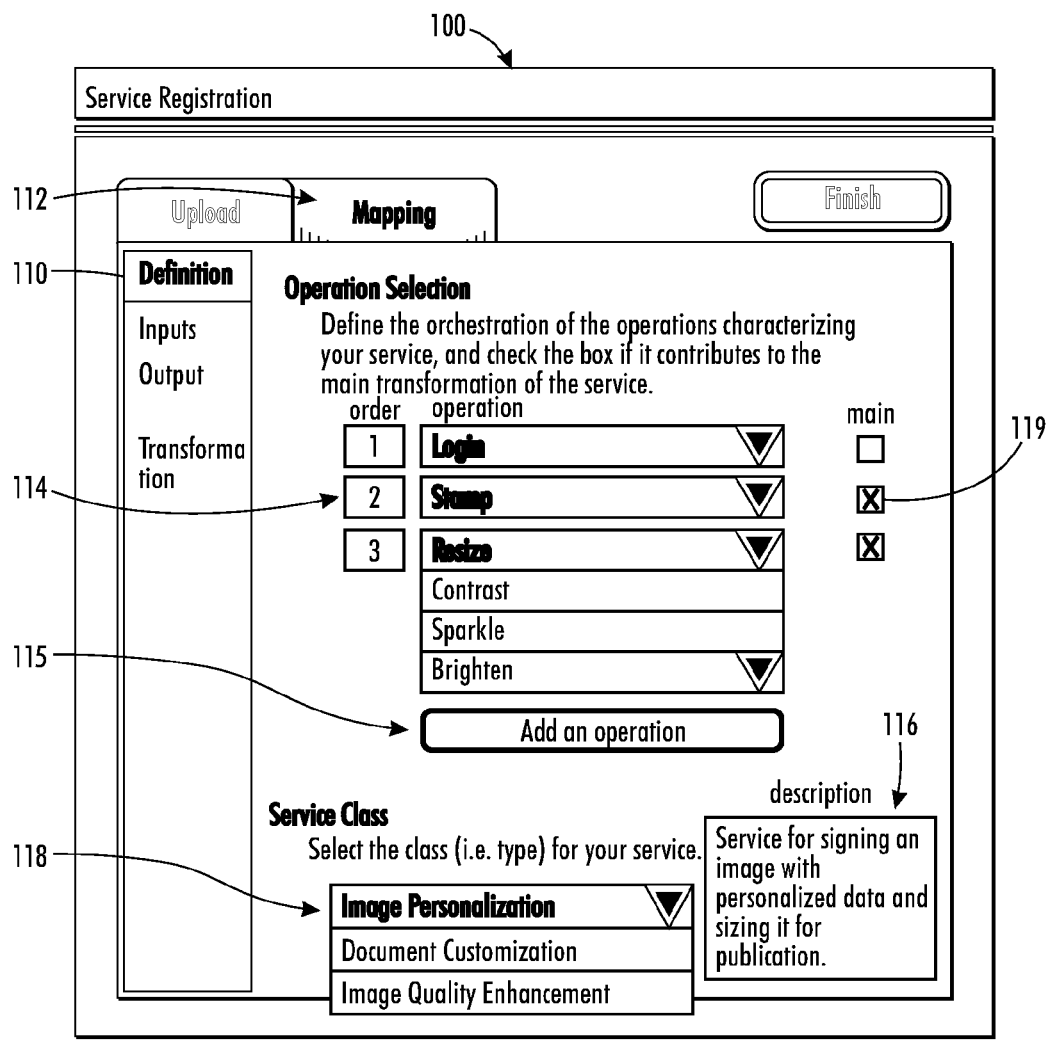
FIG. 2 is a schematic diagram of a screenshot according to embodiments herein.

One exemplary order for going through the fields in the registration interface is to first choose one or more operations 114 that define the registered service, as shown in FIG. 2. FIG. 2 illustrates the definition portion 110 of the mapping tab 112 of the interface 100. If the service has more than one operation, the user must define their orchestration (e.g., the order in which the steps of the service are performed) by establishing the intended ordering as illustrated by item 114 FIG. 2, e.g. Login, then Stamp, then Resize. This accommodates the web services that have operations that must be invoked together in a particular way, and cannot stand alone, even though this cannot be described in the WSDL syntax. The user may mark one or several operations as being "main" to the service (see the checkboxes 119 in FIG. 2), which means that they perform the functional part of the service. Defining an orchestration of operations may lead to the update of the suggestions contained in the drop-down list for the class (item 115 in FIG. 2).

Based on similarities of the service name 106, the service description 108, and potentially on the operations 114, to those of previously defined classes, suggested service classes are automatically provided to the service provider in a drop down menu 118 in ranked order (based on a similarity ranking). Further descriptions of the various classes 116 can also be provided to the service provider to help them select the appropriate class.

The service provider selects the class if an appropriate one is available or adds a new class if one is not (118 FIG. 2). A set of class definitions within an application domain is used for bootstrapping the system to make an initial set of class suggestions 118 available to the service provider. As explained later in Section 2.2.4, this initial set of classes is extensible through class generalization and splitting.

Figure 3:
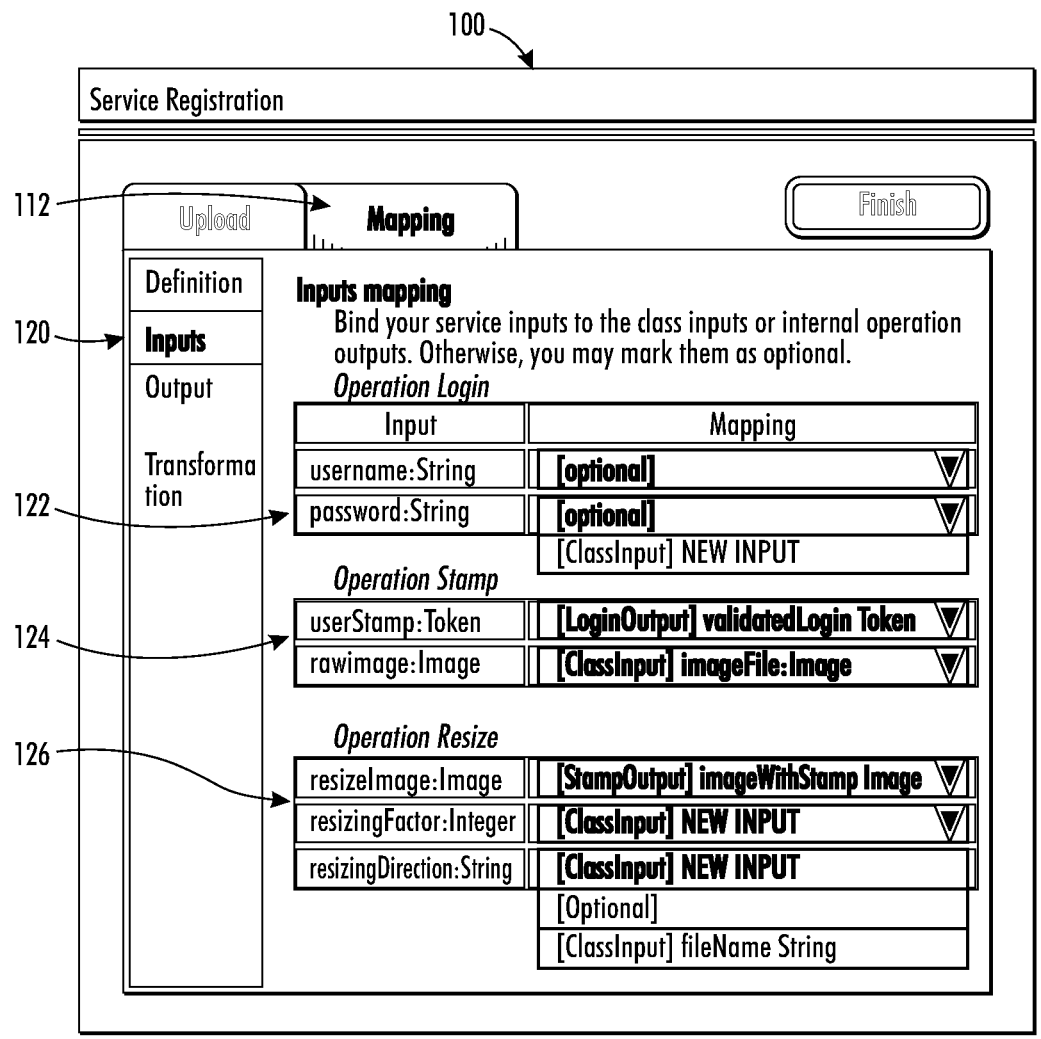
FIG. 3 is a schematic diagram of a screenshot according to embodiments herein.

FIG. 3 illustrates the mapping tab 112 and input portion 120 to allow the service provider to map inputs to either: a) existing class inputs (e.g., in operation stamp 124 in FIG. 3, rawImage is mapped to the class input imageFile); b) new class inputs (e.g. password in operation login 122); or c) or internal operation outputs (e.g., resizeImage is bound to imageWithStamp Stamp operation resize 126). Otherwise, marking them as optional, e.g., resizingDirection in operation resize 126. As opposed to functional inputs which are expected to change for every invocation, optional inputs can have default values that remain constant through multiple invocations of a service and can be set for a batch of invocations. They are requested at the time of workflow deployment.

Figure 4:
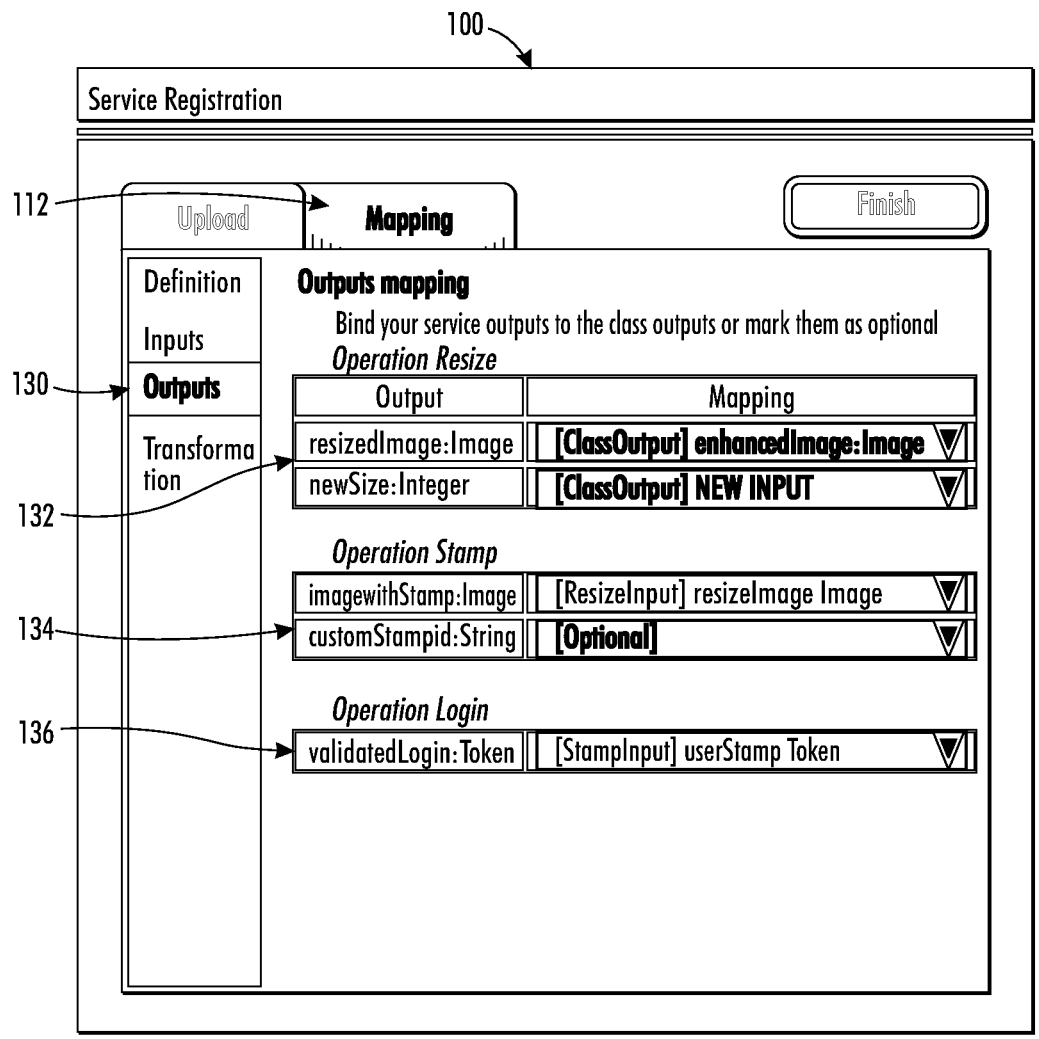
FIG. 4 is a schematic diagram of a screenshot according to embodiments herein.

FIG. 4 illustrates the mapping tab 112 and output portion 130 to allow the service provider to map remaining outputs to either: a) existing class outputs (e.g., in FIG. 4, resizedImage is mapped to class output enhancedImage in operation resize 132); or b) new class outputs (e.g., newSize in operation resize 132). Some outputs may not need to be mapped (operation login 136) because their value would not be used in the corresponding service. The user can mark them as optional (i.e. unused in the class output), e.g., customStampId in the operation stamp 134.

Figure 5:
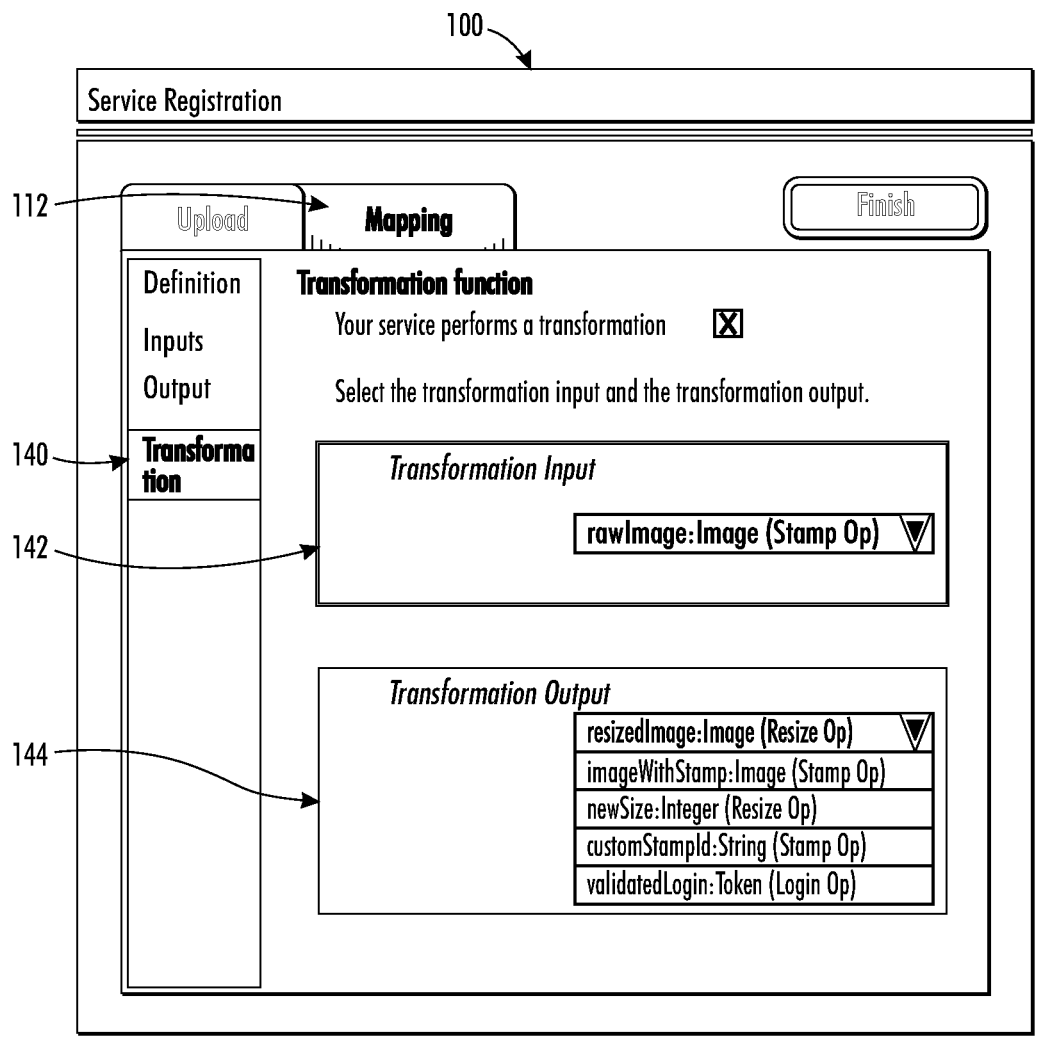
FIG. 5 is a schematic diagram of a screenshot according to embodiments herein.

FIG. 5 illustrates the mapping tab 112 and transformation portion 140 to allow the service provider to select from the main operation inputs 142 and outputs 144 and to map those that map to the left and right hand sides of the class transformation function, if any (see FIG. 5). Section 2 below will explains this notion in further details. The smart behavior of the service registration interface is enabled by a set of heuristics that are used by the system in order to classify and rank the registration options, thus assisting the user in selecting the class corresponding to the registered service, and selecting the correct bindings for inputs and outputs. Furthermore, the system updates class interfaces as new services are registered in order to accommodate differences in services while still having a generic type encompassing them.

1.4 Automatic Wrapper Generation

The result of the interaction with the service provider with the registration interface is a complete description of the service and its class, operations and input/output mappings, and possible transformations. This information is used to populate a database entry for the service, and eventually to automatically generate wrappers (stubs) that will make the service invokable by a business process execution engine.

The wrapper is responsible for creating an instance of the service code base, e.g. using WSDL stubs, passing the class input parameters from the workflow level to the operation level, making the appropriate data type conversions, i.e. casting or invoking conversion code, invoking the orchestrated operations in order, passing parameters from one to the other, and passing the final operation output to the class outputs at the workflow level, making the appropriate data type conversions, i.e. casting or invoking conversion code.

1.5 Usefulness

The systems and methods herein assist service providers to specify the way their services should be used both in terms of function and interface. This makes the systems and methods herein both composable and reusable for multiple workflows without putting undue burden on the provider to anticipate and develop for all of these different uses. Specifically, the service registration system allows service providers to register and describe their services, mapping them to a generic service type in a repository of abstract services, and thus setting up an implicit agreement on service semantics and use. Consequently, that removes the requirement on service users, e.g. non-programmer analysts, to have knowledge about inter-organizational services. Also, the systems and methods herein reduce the burden on the service provider by assisting him/her in the interaction with the interface, while still delivering the benefits of business process reuse. By designing the system as an assistive technology (i.e. giving suggestions) but still allowing the user to fully configure the registration options, the payoff for making good suggestions is high, whereas the penalty for making inaccurate ones is small.

2. Procedures for Ranking Service Registration Suggestions 2.1 Procedure for Ranking Class Suggestions This procedure is the one systems and methods herein used in order to rank the classes that are suggested to the user. It is applied after the service provider has uploaded, named, and described his/her service (stage corresponding to FIG. 1), or after the service provider has selected an orchestration of operations for the new service in the interface (FIG. 2). The only difference between the two procedures is that the latter uses the ordering from the selected orchestration in the comparison of the registered service operations with the service class operations.

2.1.1 Multi-Level Comparison Approach

The systems and methods herein classify and rank the classes (i.e. service types) under which the registered one will be classified according to the semantic distance between these classes and the service. The semantic distance between a service and the available classes takes into account the following information, the service name and description, and the service operations (name, description, and orchestration).

Figure 6:
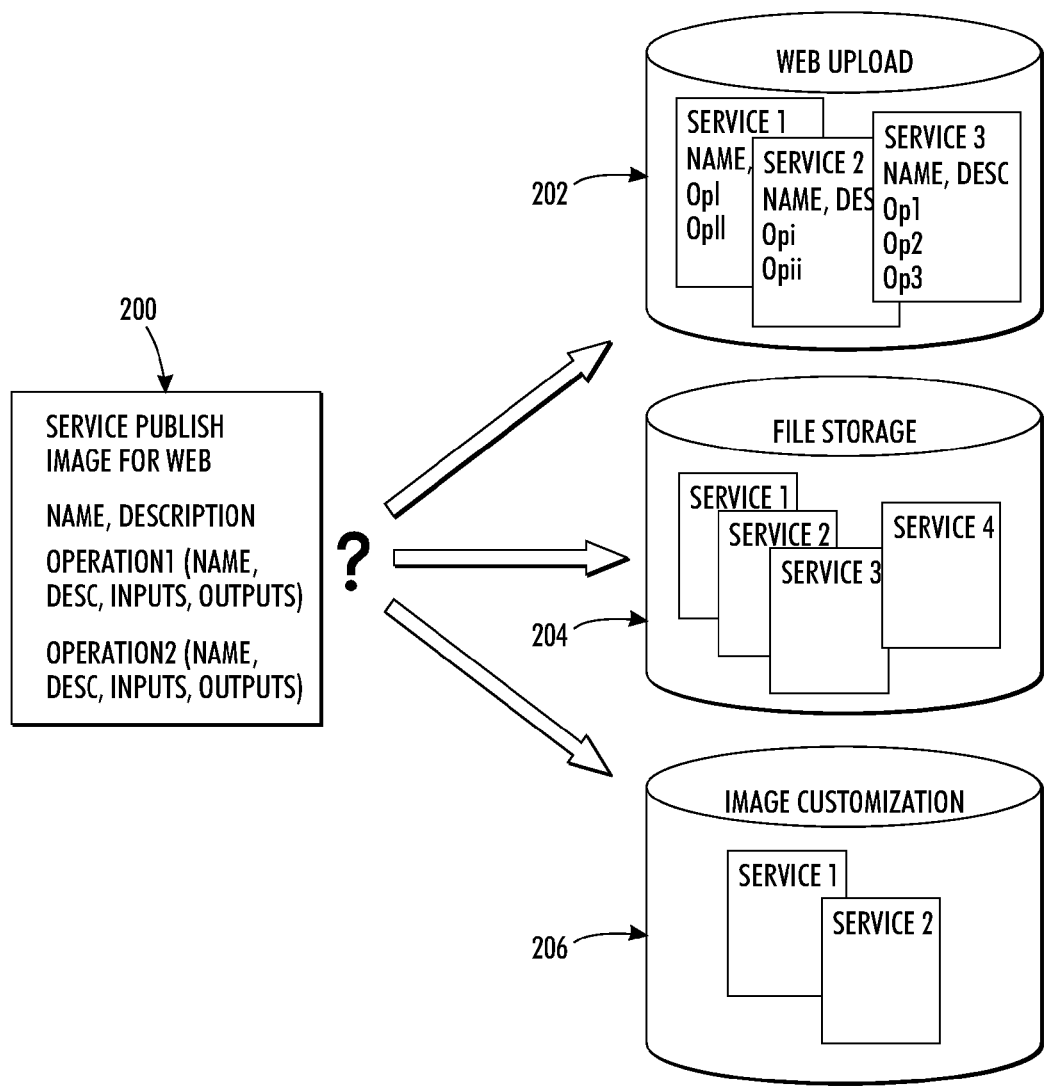
FIG. 6 is a schematic functional block diagram illustrating features of embodiments herein.

Each class can be represented by the set of code base services belonging to it, thus their names, descriptions, operation names, operation descriptions, and operation orchestrations. As illustrated by FIG. 6, the matchmaking process evaluates the semantic distance between the name and description of the service 200, and both the semantic and functional distance between the operations of the service with those of each class (e.g., web upload services class 202, file storage services class 204, image customization class 206, etc.)

The comparison of a service with those belonging to a class is made at two levels, service level and operation level. The service level averages the semantic distance of the service name and description with the aggregation of the class name and description. This aggregation is obtained by evaluating the semantic distance of each service name and description within the class they belong to. Semantic approaches for exact and fuzzy matching, e.g. [Corley and Mihalcea, 05, Seco et al, 04, Chang et al, 10], may be used in order to assess this similarity. The operation level compares the operations of the new service with the fuzzy sets of operations of the class. These class sets correspond to the result of the fuzzy set operations, intersection and union, of the class operation sets. When a service is added to a class, the fuzzy sets of operations of the class are updated, and it is these updated sets that are compared to subsequent new services.

Each level is given a score, given by SL and OL for service level and operation level, respectively, depending on the similarity of the services at the corresponding level. With these level scores, the global distance between a service and a specific class T is assessed by the following formula:

$$\text{Distance}_{S,T} = \text{conf}_{SL} \cdot SL + \text{conf}_{OL} \cdot OL$$

Where $\text{conf}_{SL}$ and $\text{conf}_{OL}$, which are specified further on, are the confidence degrees in the semantic distance assessment (scores) for the two levels. This disclosure first explains the score calculation at the Operation Level, and then clarifies how this calculation procedure can be applied similarly to the service level score calculation and even recursively for the comparison of operations within the services.

2.1.2 Score Calculation

The similarity score of a service with a class at the Operation Level is computed by the following formula:

$$OL = \max(\alpha \langle S_{OL} \cap T_\cap \rangle, \beta \langle S_{OL} \cap T_\cup \rangle)$$

$T_\cap$ corresponds to the fuzzy intersection set of the operations of the services in T.

$T_\cup$ corresponds to the fuzzy union set of operations of the services in T.

$S_{OL}$ is the fuzzy set of operations of the new service. It is assumed that each operation belongs to its service set with degree 1.

$\alpha$ is the weight given to the intersection with the intersection set $T_\cap$, i.e. $\langle S_{OL} \cap T_\cap \rangle$, based on the number of services in T, and is directly proportional to the number of services. The reason for adding a weighing factor proportional to the number of services is that if there is something in common between all the services of a set, the higher the number of the services, the more likely that that is a defining feature of the set. Thus, with a higher weight, this feature will contribute more to the definition of the class.

$\beta$ is the weight given to the intersection with the union set $T_\cup$, i.e. $\langle S_{OL} \cap T_\cup \rangle$, based on the number of services in T. It is inversely proportional to the number of services, so that $\alpha + \beta = 1$. $\beta$ is complementary to $\alpha$ because with a smaller number of services, the intersection is less meaningful to define the class, and thus any similarity the service has with some other service in the class is given more weight to determine its similarity with the class.

The fuzzy intersection operation in the above definition, i.e. $\langle S_{OL} \cap T_{\cap} \rangle$ and $\langle S_{OL} \cap T_{\cup} \rangle$, produces a value that is computed from the degree of membership of the operations with respect to the resulting intersection set. Therefore, a numeric value is obtained as a result of the formula for OL.

Figure 7:
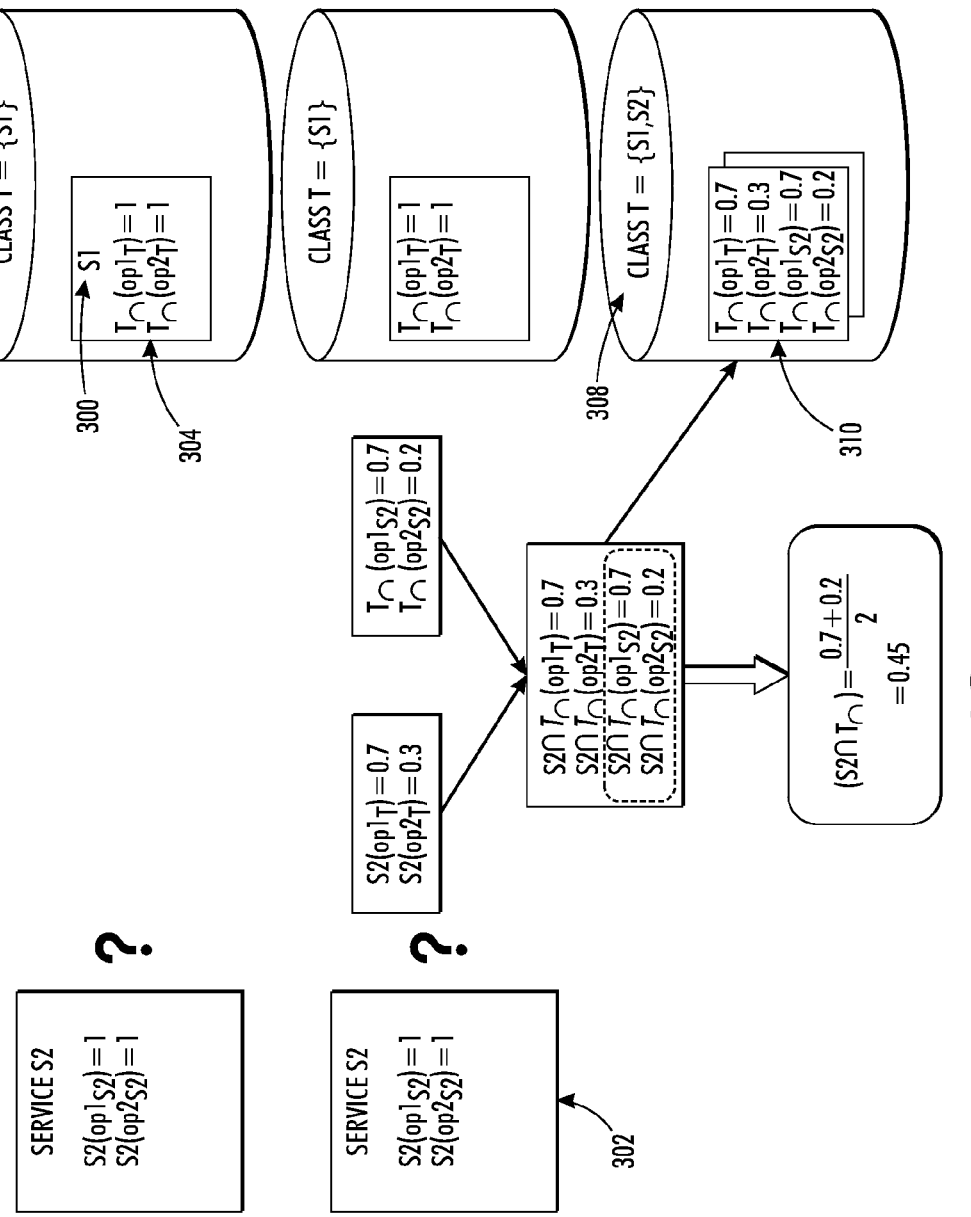
FIG. 7 is a schematic functional block diagram illustrating features of embodiments herein.

FIG. 7 illustrates the calculation of the intersection 310 set membership ($T_{\cap}$) of the operations of a service (302) S2 compared to an existing class T (304 which contains service (300) S1 initially), and the update of the class after the service S2 (302) is added to it (308). This calculation is detailed hereafter, and it can be similarly applied to the calculation of the union set ($T_{\cup}$).

For each operation $op_S \in S_{OL}$ and $op_T \in T$, its degree of membership with each set, denoted as $S_{OL}(op)$, $T_{\cap}(op)$, and $T_{\cup}(op)$ is obtained as:

$$S_{OL}(op_S) = T_{\cap}(op_T) = T_{\cup}(op_T) = 1$$

$$S_{OL}(op_T) = \max_{op_S \in S_{OL}} (dist(op_T, op_S))$$

$$T_{\cap}(op_S) = 1 - \min_{op_T \in T} (dist(op_S, op_T))$$

$$T_{\cup}(op_S) = \max_{op_T \in T} (dist(op_S, op_T))$$

The degree of membership of every operation $op \in S_{OL} \cup T$ to the intersection sets is then obtained from standard fuzzy operations as:

$$(S_{OL} \cap T_{\cap})(op) = \min(S_{OL}(op), T_{\cap}(op))$$

$$(S_{OL} \cap T_{\cup})(op) = \min(S_{OL}(op), T_{\cup}(op))$$

We therefore define the operation value as follows:

$$\langle S_{OL} \cap T_{\cap} \rangle = \frac{1}{|S_{OL}|} \sum_{op \in S_{OL}} (S_{OL} \cap T_{\cap})(op)$$

$$\langle S_{OL} \cap T_{\cup} \rangle = \frac{1}{|S_{OL}|} \sum_{op \in S_{OL}} (S_{OL} \cap T_{\cup})(op)$$

Once a new service S is assigned to a class T, the intersection and union sets are updated as follows:

$$T_{\cap}^{(i+1)}(op) = (S_{OL} \cap T_{\cap}^{(i)})(op)$$

$$T_{\cup}^{(i+1)}(op) = (S_{OL} \cap T_{\cup}^{(i)})(op)$$

Finally, the confidence factor for OL, i.e. $conf_{OL}$, is obtained from the membership function of the intersection set as follows:

$$conf_{OL} = \frac{1}{|T_{\cap}|} \sum_{op \in T_{\cap}} T_{\cap}(op)$$

The intuition for this is that the Operation Level is more likely to be meaningful if there is a lot in common in how the services perform their tasks (i.e. use the same operations).

2.1.3 Extended Application of Score Calculation

At the Service Level, a natural language processing method may be used for calculating similarity between two service descriptions, and then methods for obtaining the aggregations of services like we did for the intersection and union sets for the Operation Level. However, these aggregations may depend on the specific semantic method used and therefore we exclude it from the systems and methods herein description. Otherwise, the general method and calculation of confidence are done the same way.

For comparing two operations, each operation pair can be decomposed into comparable elements, i.e. names to names, descriptions to descriptions, inputs to inputs, etc, to obtain approximate values of similarity within each element category (name, description, etc). Between inputs and outputs, more weight is given to matches of outputs between operations because it is the result of an operation that more directly represents its purpose. However, the same score calculation described in the previous section for service descriptions and operations can be applied at the level of operation description and inputs/outputs.

2.2 Procedure for Ranking Input Parameter Suggestions

At this point of the registration, the user has chosen the class and the orchestration of operations defining his/her service. When it comes to binding inputs of each of the operations (see FIG. 3), the system ranks the following options that are available the class inputs, the internal outputs of all the operations preceding the operation to which the input belongs, the option of extending the class by creating a new class input, and the option of labeling the input as an optional parameter of the service.

The system classifies class inputs and internal operation outputs according to semantic and syntactic compatibility. The syntactic compatibility assessment relies on a data type framework presented in the next section. Section 2.2.2 explains the notion of the transformation function. The ranking of the mapping options is performed by a set of heuristics, the details of which are shown in Section 2.2.3. Finally, Section 2.2.4 explains how the class interface is extended by class generalization and splitting.

2.2.1 Syntactic Compatibility

Figure 8:
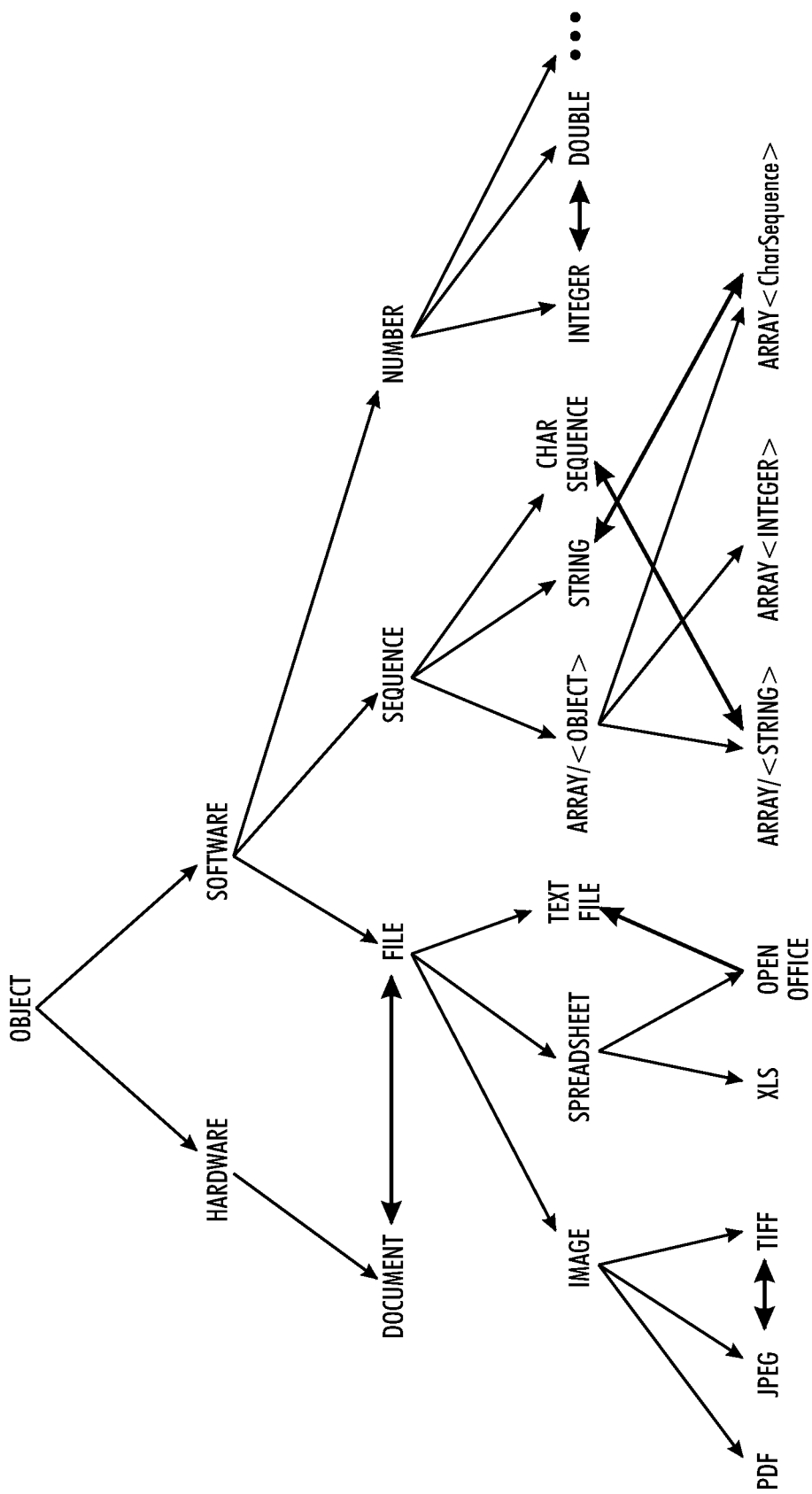
FIG. 8 is a schematic diagram of a data framework according to embodiments herein.

The syntactic compatibility between two parameters is assessed using a data type framework defined within the business process domain as illustrated by FIG. 8. Two data types are said to be compatible if they are on the same path of the hierarchy originating from the root. To convert a data type to another lower (respec. higher) in the hierarchy, a cast (respec. forced cast) is performed. In this figure, a bold arrow linking two data types means that a conversion service exists to convert one to the other.

2.2.2 Transformation Function

Figure 9:
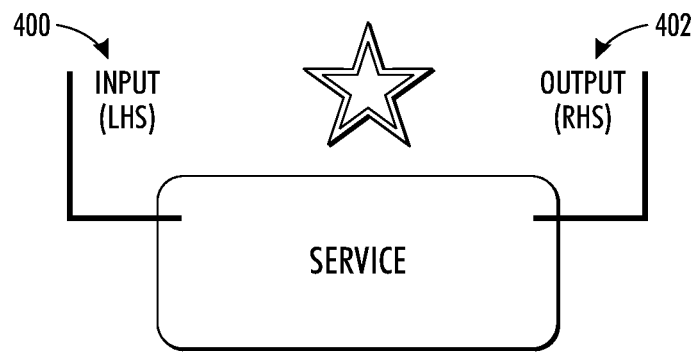
FIG. 9 is a schematic functional block diagram illustrating features of embodiments herein.

Each class may have a transformation function defined by associating the main input with the main output of the service type, e.g., the service type Image Personalization transforms the input imageFile to the output enhancedImage. This disclosure refers to the input as the left hand side (LHS 400) of the transformation, and the output as the right hand side (RHS 402) as shown in FIG. 9.

A parameter is considered "main" to a service type if the function/purpose of that type is affected the most by removing/changing the parameter.

The transformation function applies by default to inputs and outputs which: 1) have compatible data types, 2) have a small semantic distance (see Section 2.2.4). The service provider may then override it by linking the inputs and outputs involved in a transformation during service registration.

The transformation function for the service can be chosen by the service providers during the registration process (see FIG. 5) and this choice is generalized to the class transformation function. Although a service should define a transformation function between a single input and a single output, if the provider selects more than one input/output, the service provider will also have to choose whether they are alternatives or an aggregation (composing a single output).

2.2.3 Parameter Categorization and Ranking Heuristics a. Input Suggestions

In order to rank the mapping options for each input, the system categorizes class inputs and internal operation output according to their semantic and syntactic compatibility with the input to map. These categories are shown in ranked order:

I) Semantically close and
  i. sub-type (i.e. the mapping option is a sub-type of the input to map)
  ii. super-type
  iii. syntactically incompatible, but convertible
  iv. syntactically incompatible, and not convertible
II) Semantically far and
  i. sub-type
  ii. super-type
  iii. syntactically incompatible, but convertible Semantic distance is assessed and we assume that the method gives a binary assessment (i.e. close or far). Syntactic compatibility is then assessed using the data type framework. If a conversion does not exist between two data types, the developer is asked to suggest a generalization or even write the conversion code to extend the data type framework.

Note that syntactically incompatible and not convertible parameters are only presented when the pair of parameters are semantically close, because the semantic similarity is enough to assume that a conversion may exist between them. In the absence of such semantic similarity, these parameters are not presented as options to the user.

Figure 10:
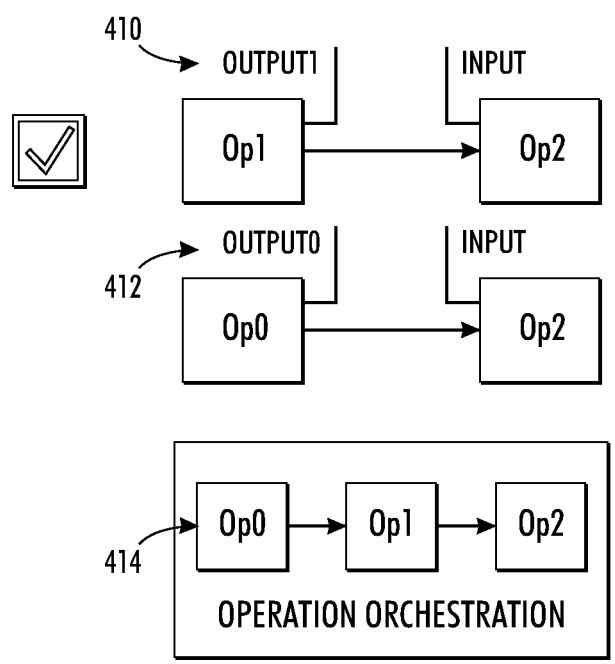
FIG. 10 is a schematic functional block diagram illustrating features of embodiments herein.
Figure 11:
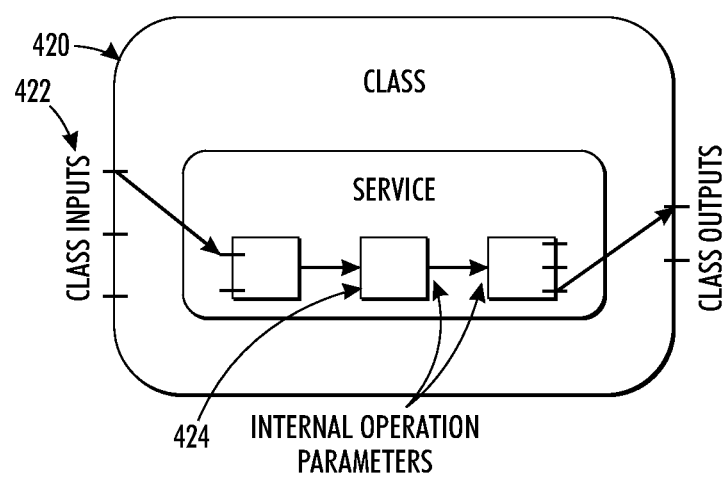
FIG. 11 is a schematic functional block diagram illustrating features of embodiments herein.
Figure 12:
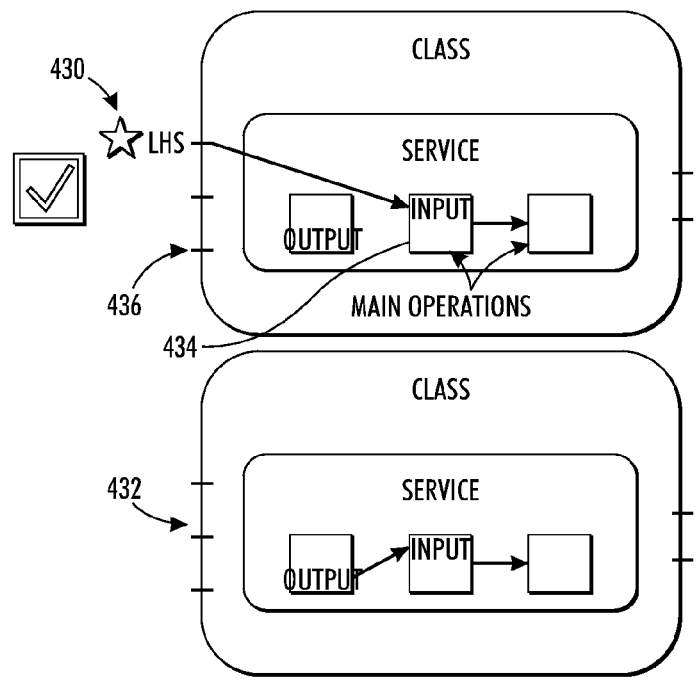
FIG. 12 is a schematic functional block diagram illustrating features of embodiments herein.
Figure 13:
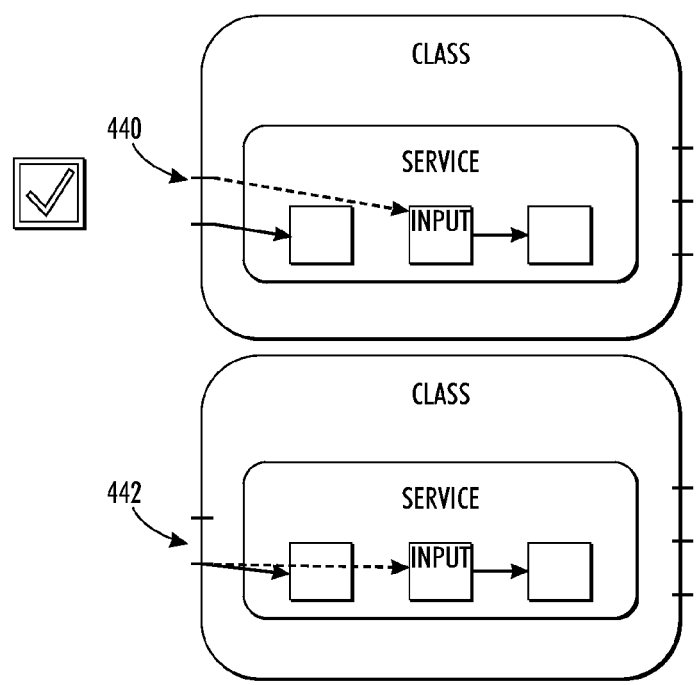
FIG. 13 is a schematic functional block diagram illustrating features of embodiments herein.

In each category, the options are ranked according to the following heuristics, shown here in ranked order:

a) As shown in FIG. 10, for internal operation outputs 410, 412, the output produced by the closest operation in the operations orchestration 414 is ranked first (i.e. 410).

b) As shown in FIG. 11, class interfaces 420 are assumed to enclose internal orchestrated operations. Class inputs 422 will then be considered as outputs produced by an imaginary first operation, and therefore ranked accordingly by the first heuristic, i.e. class inputs are ranked before internal operation outputs 424.

c) As shown in FIG. 12, the input from the class 430 that is associated with the LHS of its transformation function will rank higher as an option for a compatible input of the service main operation(s) (434) than inputs that are not (436), or if the class does not have a transformation function defined (432).

d) As shown in FIG. 13, not previously bound parameters 440 will rank higher than already bound ones 442.

e) Any input of a main operation that is not categorized according to I) and II) is suggested to be mapped to a new class input. Inputs of other operations are suggested as optional (as shown by item 122 in FIG. 2).

b. Output Suggestions

Some of the outputs have already been bound at the input mapping stage. Those that are not must be mapped to class outputs in a manner analogous to ranking and binding for inputs explained in the previous section.

2.2.4 Extending the Class Interface

After selecting the orchestration of operations, the class to which the service belongs, and mapping the inputs and outputs, the user identifies from the service parameters those that correspond to the transformation function LHS and RHS (see FIG. 5), if such a function is defined. The default values are the parameters of the service operations that are mapped to the existing class LHS/RHS. Otherwise, the main operation parameters are given as the first suggestions giving preference to those that are compatible with the class LHS/RHS.

Figure 14:
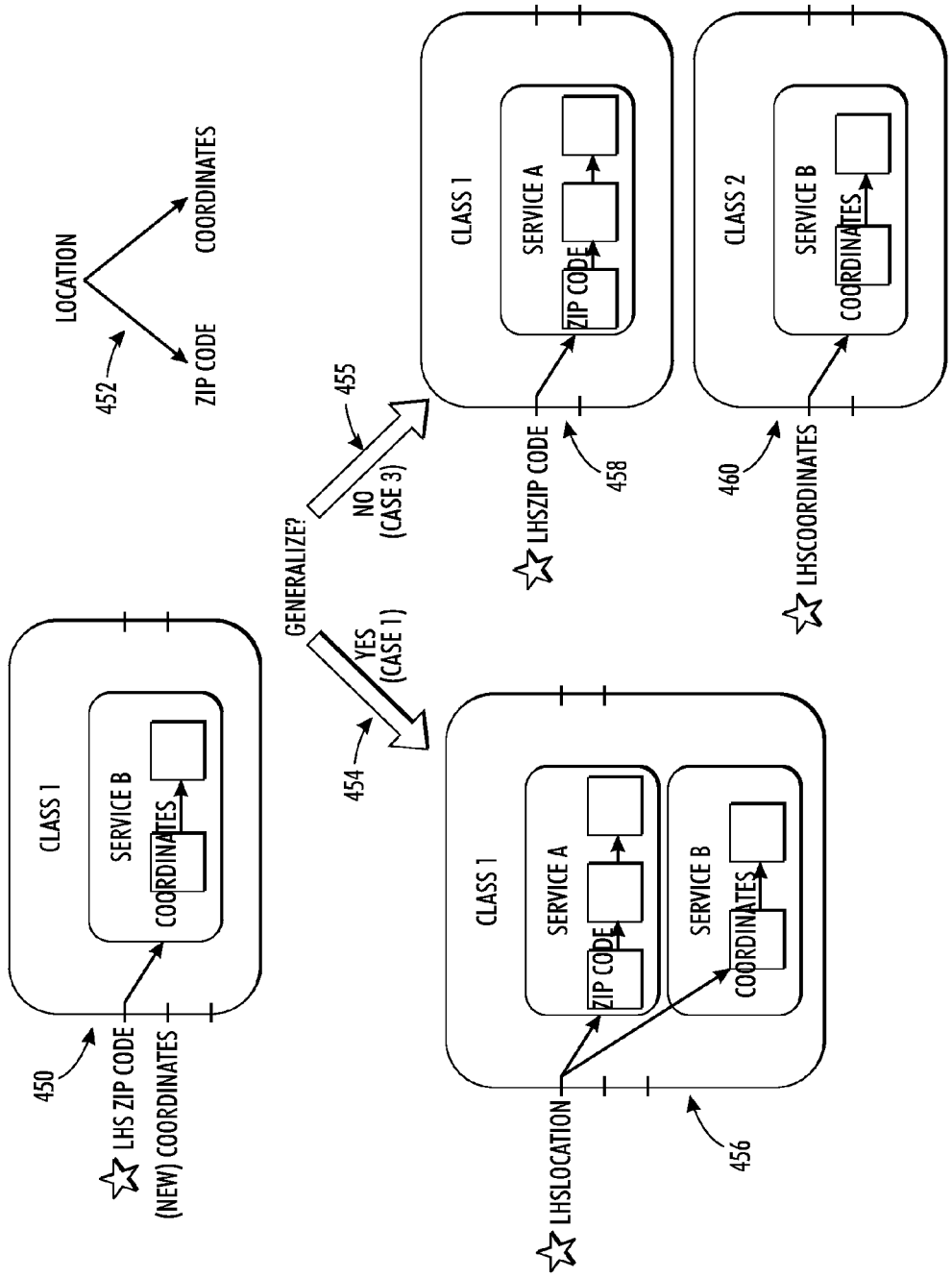
FIG. 14 is a schematic functional block diagram illustrating features of embodiments herein.
Figure 15:
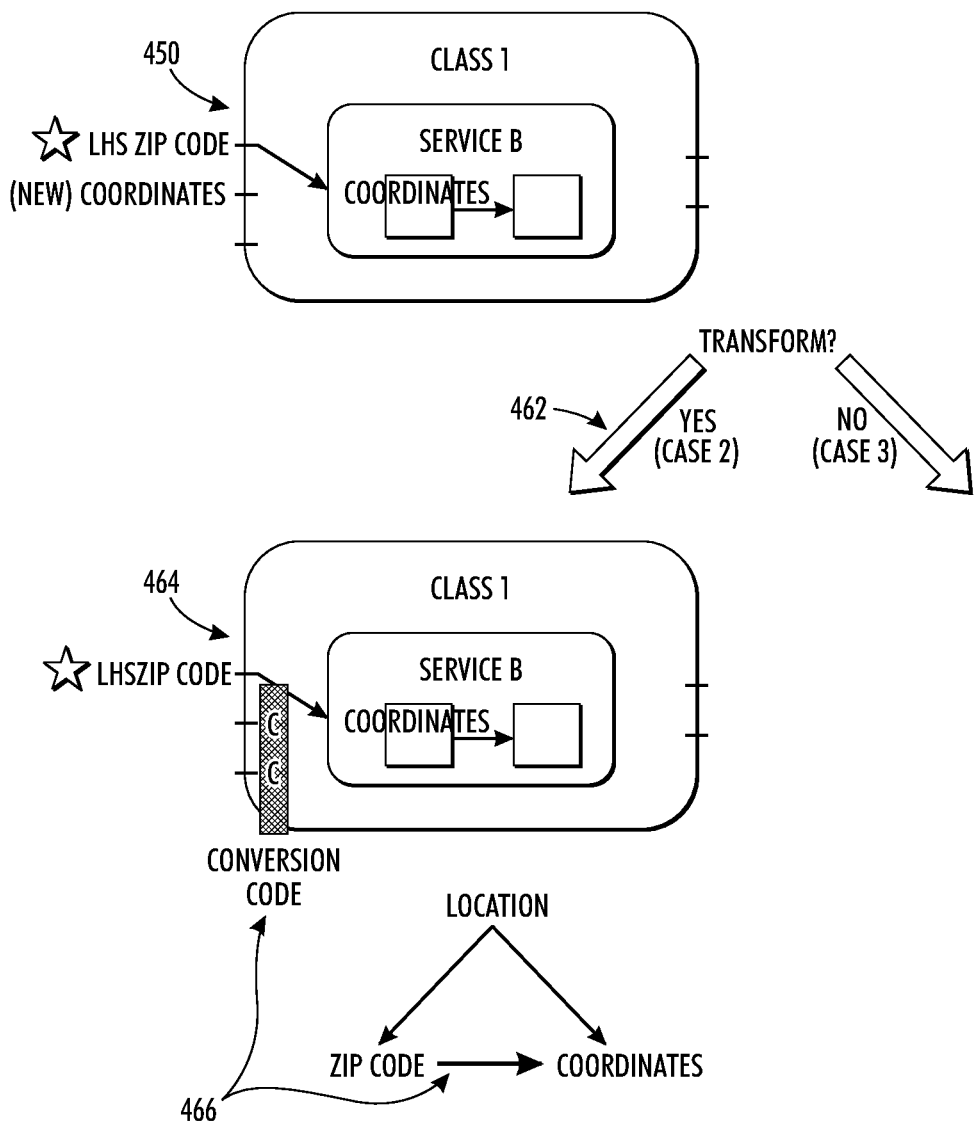
FIG. 15 is a schematic functional block diagram illustrating features of embodiments herein.

In case the selected service LHS (respec. RHS) does not match with the class LHS (respec. RHS), the user has to choose between three options, as shown in FIGS. 14 and 15:

1) Generalize the class LHS (respec. RHS): The suggestion, computed from data type framework, takes the deepest common super-type (see FIG. 14, 452). This option is only available if the class LHS (respec. RHS) 450 is not bound already (left decision arrow 454 to item 456).

2) Select/Write a conversion code from the service LHS (respec. class RHS) to the class LHS (respec. service RHS) and vice versa (see FIG. 15, 462): If the conversion is from the class LHS to the service LHS (466), then the service LHS is remapped to the class LHS is (464). The wrappers of the services previously registered within the class need to be regenerated accordingly.

3) Split the class 450 into 458 and 460: And register the service as a member of a new class whose transformation function corresponds to the service transformation function (see FIG. 14, right decision arrow 455). If the class does not have a transformation function defined but the provider defines one for his/her service, or if the LHS of the defined transformation is already bound, then the class must be split as in case 3) above.

Thus, as shown above, the systems and methods herein provide a service registration interface that assists a service provider in classifying and mapping his/her service to make it reusable and interoperable on a business process platform, methods for assessing the similarity of service to service grouped in a generic class, which is then used to rank suggestions for service classification, provide heuristics that are used to rank suggestions for mapping class and service operations parameters, and link the resulting service registration to automatic wrapper generation and a platform for service composition.

Figure 16:
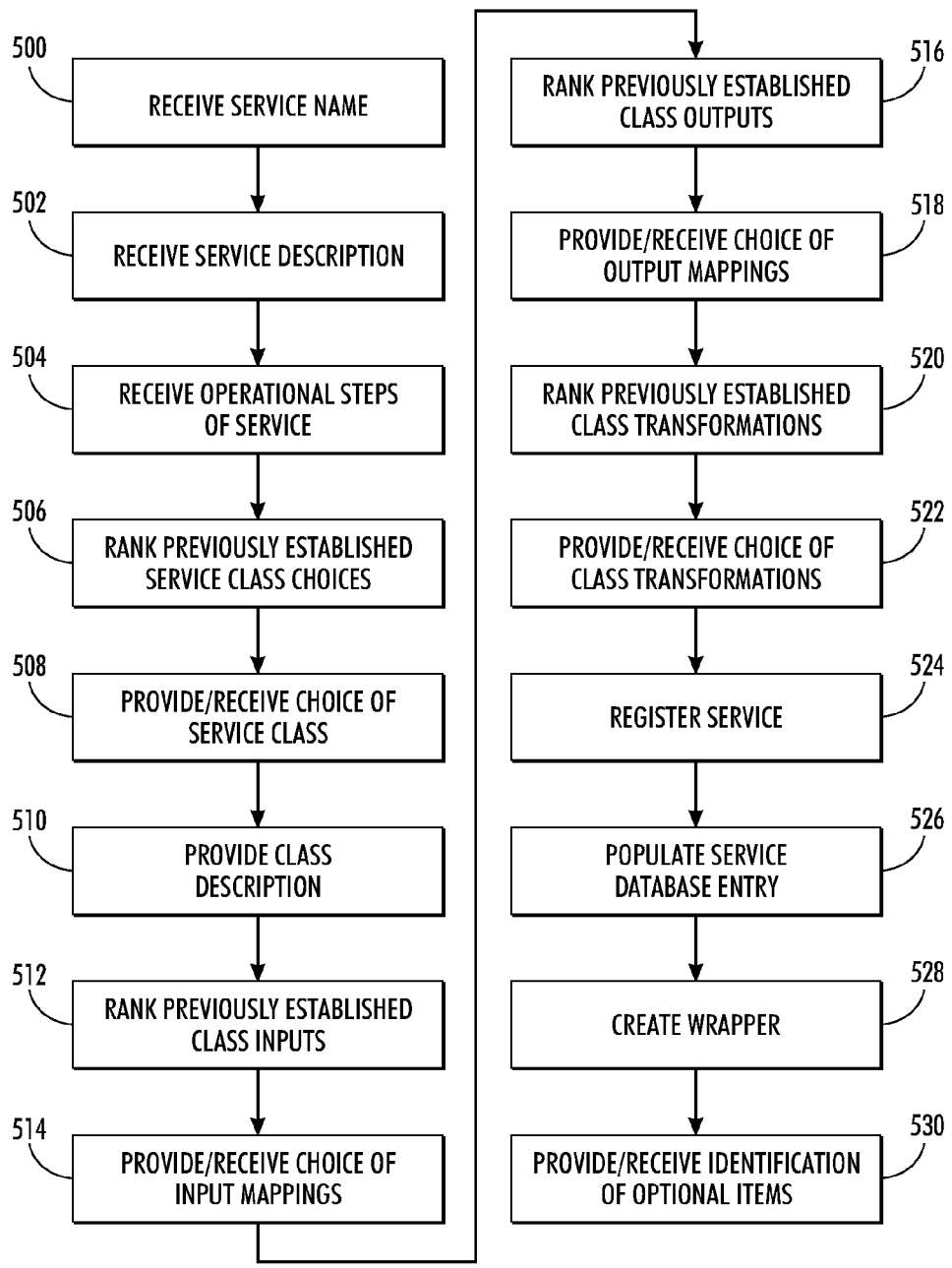
FIG. 16 is a flow diagram illustrating features of embodiments herein.

FIG. 16 is flowchart illustrating exemplary methods herein that provide a service registration interface to the service provider using a graphic user interface of a computerized device. The methods herein automatically provide a service name field on the service registration interface into which the service provider inputs a service name of a service being registered, in item 500. Also, in item 502, the methods herein automatically provide a service description field on the service registration interface into which the service provider inputs a service description of the service being registered.

The methods herein also automatically provide a plurality of service operation fields on the service registration interface in item 504. The service operation fields have a drop down menu of previously established operation choices from which the service provider chooses operational steps of the service being registered, and can provide a field to allow the service provider to manually input the operational steps of the service being registered.

Such methods rank service class choices from previously established service classes into a ranked order (e.g., a "first" ranked order) in item 506. The first ranked order is based on similarities between the service name, the service description, and/or the operational steps of the service being registered, and corresponding names, descriptions, and operational steps of the previously established service classes. The process of ranking of the service class choices 506 comprises evaluating semantic distances between the service name, the service description, and the operational steps of the service being registered and the corresponding names, descriptions, and operational steps of the previously established service classes.

With such, the methods herein automatically provide a service class field on the service registration interface that has a drop down menu of the service class choices presented in the first ranked order (from which the service provider chooses a selected service class for the service being registered) in item 508. The methods herein automatically can also provide a class description when automatically providing the drop down menu of the service class choices in item 510. The service class field can also provide a field to allow the service provider to manually input the selected service class for the service being registered.

In item 512, the methods herein additionally rank previously established class inputs into a second ranked order based on a similarly between user inputs (items required from users during the operational steps of the service being registered) and previously established inputs required by previously established services in the selected service class. The methods herein automatically provide a plurality of input mapping fields on the service registration interface for each of the user inputs in item 514. The input mapping fields have a drop down menu of the previously established class inputs to be mapped to the user inputs presented in the second ranked order (from which the service provider chooses selected class input mappings) 514. The input mapping fields can also include fields for manually entering the selected class input mappings.

Further, the methods herein rank previously established class outputs into a third ranked order based on a similarly between service outputs of the service being registered (produced during the operational steps) and previously established outputs produced by the previously established services in the selected service class in item 516. The methods herein automatically provide a plurality of output mapping fields on the service registration interface for each of the service outputs in item 518. The output mapping fields have a drop down menu of the previously established class outputs to be mapped to the service outputs of the service being registered, that are presented in the third ranked order (from which the service provider chooses selected class output mappings) 518.

Also, the methods herein rank previously established class transformations into a fourth ranked order based on a similarly between the service inputs and the service outputs of the service being registered, and the previously established inputs and the previously established outputs for the selected class in item 520. The methods herein automatically provide a transformation function field on the service registration interface in item 522. The transformation function field has a drop down menu of the previously established class transformations in the fourth ranked order (from which the service provider chooses selected transformations) and has a field for manually entering the selected transformations (522).

The methods herein register the service in item 524 based on the selected service class, the selected class input mappings, the selected class output mappings, and the selected transformations. Further, the methods herein populate a service database entry (item 526) with the service name, the service description, the operational steps, the selected service class, the instructions to map inputs, the instructions to map transformation outputs, the transformation inputs, and the transformation outputs. The methods herein also generate a wrapper based on the service database entry in item 528. The wrapper maintains information from the service database entry in a format used by a business process execution engine.

As shown in item 530, the methods herein can also automatically provide an option indication field on the service registration interface. The option indication field identifies ones of the operational steps, the user inputs, the transformation inputs, and the transformation outputs that are optional in the service being registered.

Further, the methods herein expand the previously established service classes when the service provider manually inputs the selected service class for the service being registered, expand the previously established class inputs when the service provider manually enters instructions to map the user inputs to internal operational outputs of the service being registered, and expand the previously established class transformations when the service provider manually enters transformations of the service being registered.

Figure 17:
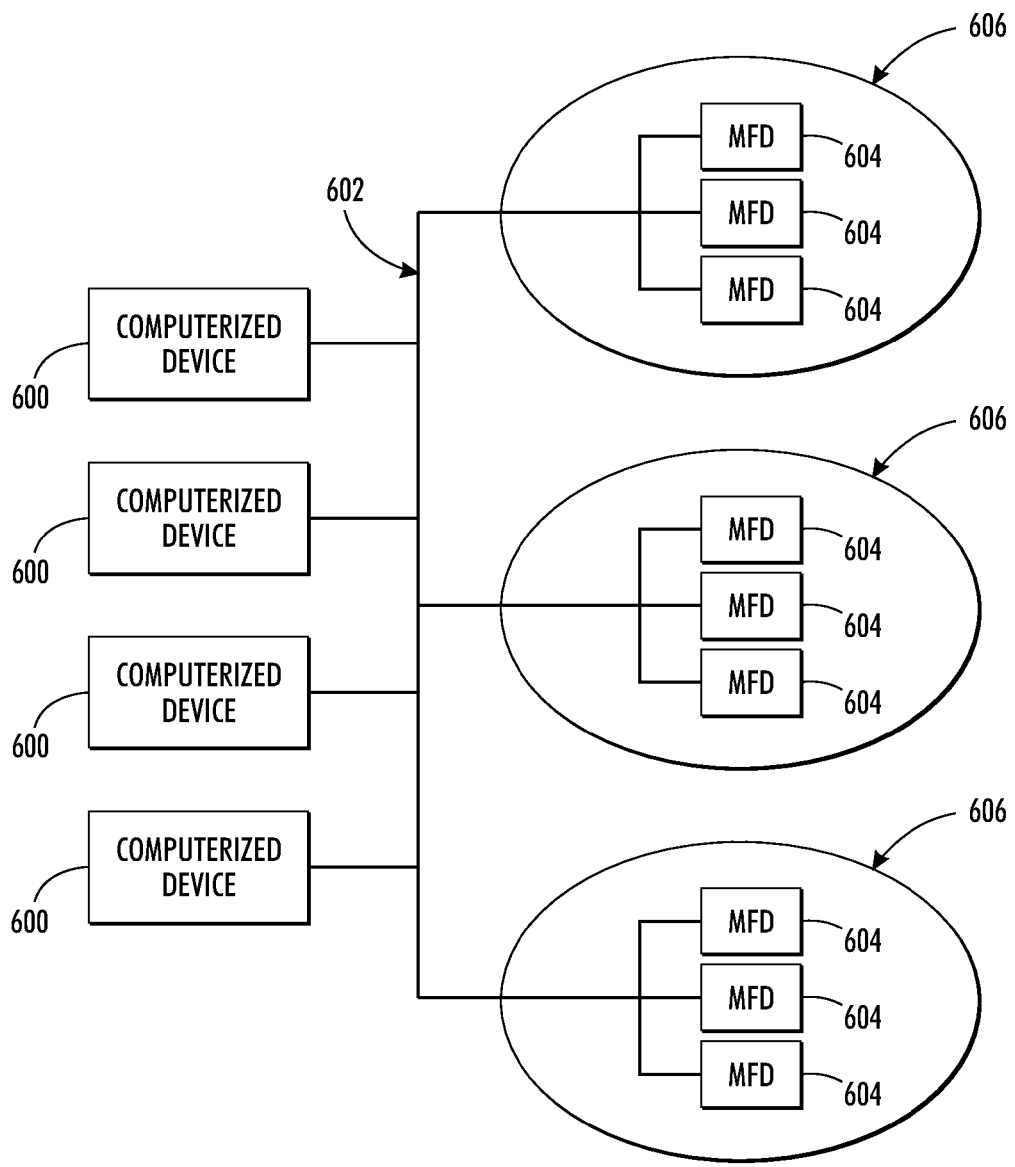
FIG. 17 is a schematic functional block diagram illustrating systems according to embodiments herein.

As shown in FIG. 17, exemplary system embodiments herein include various computerized devices 600, 604 located at various different physical locations 606. The computerized devices 600, 604 can include print servers, printing devices, personal computers, etc., and are in communication (operatively connected to one another) by way of a local or wide area (wired or wireless) network 602.

Figure 18:
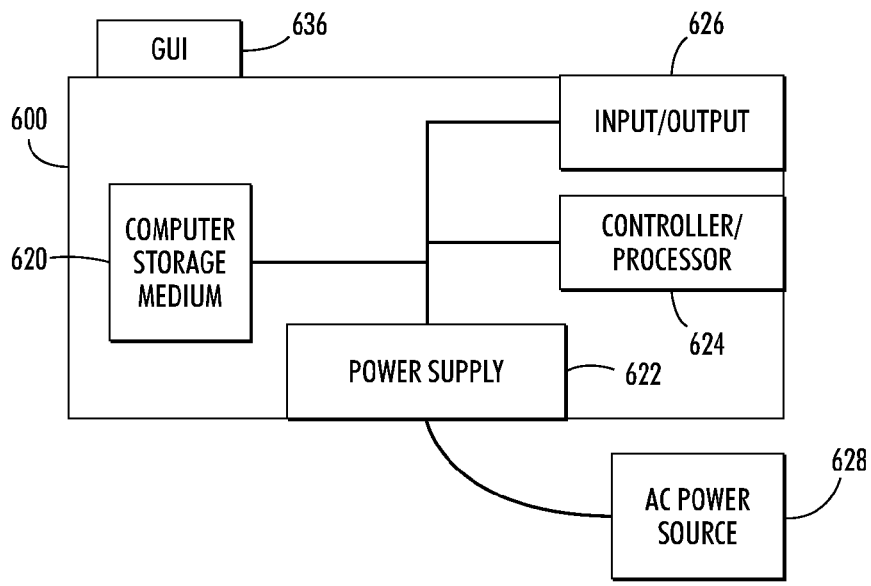
FIG. 18 is a schematic functional block diagram illustrating a computerized device according to embodiments herein.

FIG. 18 illustrates a computerized device 600, which can be used with embodiments herein and can comprise, for example, a print server, a personal computer, a portable computing device, etc. The computerized device 600 includes a controller/processor 624 and a communications port (input/output) 626 operatively connected to the processor 624 and to the computerized network 602 external to the computerized device 600. Also, the computerized device 600 can include at least one accessory functional component, such as a graphic user interface assembly 636 that also operate on the power supplied from the external power source 628 (through the power supply 622).

The input/output device 626 is used for communications to and from the computerized device 600. The processor 624 controls the various actions of the computerized device. A non-transitory computer storage medium device 620 (which can be optical, magnetic, capacitor based, etc.) is readable by the processor 624 and stores instructions that the processor 624 executes to allow the computerized device to perform its various functions, such as those described herein. Thus, as shown in FIG. 18, a body housing 600 has one or more functional components that operate on power supplied from the alternating current (AC) 628 by the power supply 622. The power supply 622 can comprise a power storage element (e.g., a battery) and connects to an external alternating current power source 628 and converts the external power into the type of power needed by the various components.

Figure 19:
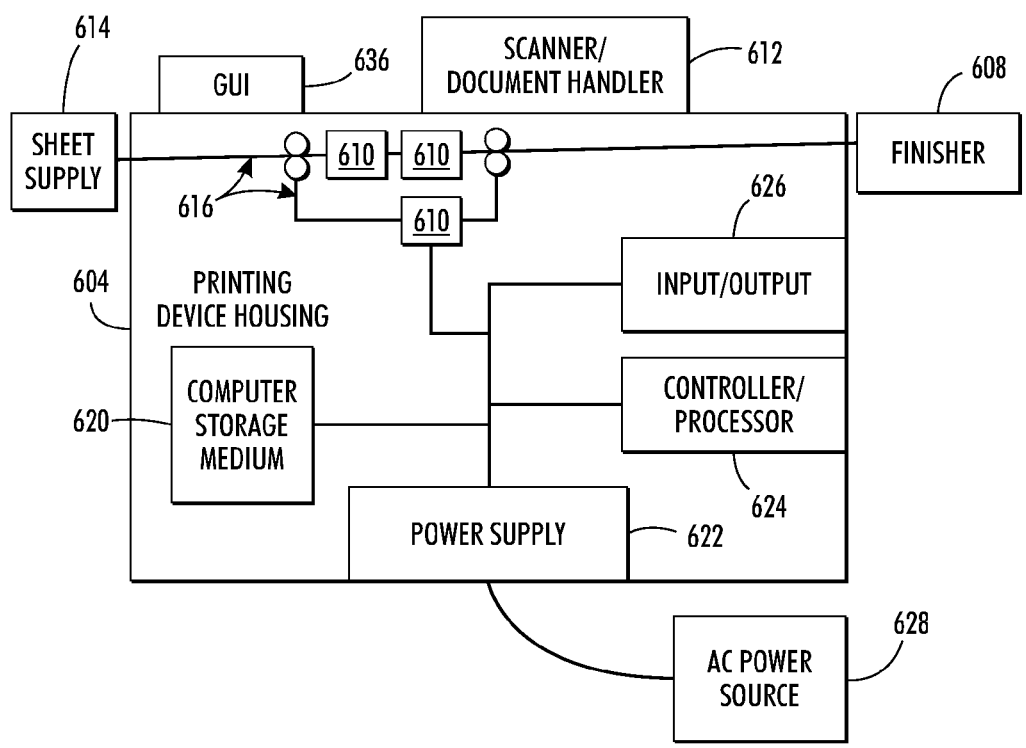
FIG. 19 is a schematic functional block diagram illustrating a printing device according to embodiments herein.

FIG. 19 illustrates a computerized device that is a printing device 604, which can be used with embodiments herein and can comprise, for example, a printer, copier, multi-function machine, multi-function device (MFD), etc. The printing device 604 includes many of the components mentioned above and at least one marking device (printing engines) 610 operatively connected to the processor 624, a media path 616 positioned to supply sheets of media from a sheet supply 614 to the marking device(s) 610, etc. After receiving various markings from the printing engine(s), the sheets of media can optionally pass to a finisher 608 which can fold, staple, sort, etc., the various printed sheets. Also, the printing device 604 can include at least one accessory functional component (such as a scanner/document handler 612, etc.) that also operate on the power supplied from the external power source 628 (through the power supply 622).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method of registering service operations provided by service providers, said method comprising:
   receiving, into a computerized device, at least one of a service name, a service description, and operational steps of a service being registered;
   automatically providing, from said computerized device, a first menu of previously established service class choices in a ranked order based on said at least one of said service name, said service description, and said operational steps;
   receiving, into said computerized device, a selected service class from said first menu for said service being registered;
   automatically providing, from said computerized device, a second menu of previously established class input mappings to user inputs required for said operational steps of said service being registered, said second menu being presented in a ranked order, based on similar input mappings of said selected service class;
   receiving, into said computerized device, selected class input mappings from said second menu for said service being registered;
   automatically providing, from said computerized device, a third menu of previously established class output mappings to outputs produced by said operational steps, said third menu being presented in a ranked order, based on similar output mappings of said selected service class;
   receiving, into said computerized device, selected class output mappings from said third menu for said service being registered;
   automatically providing, from said computerized device, a fourth menu of previously established class transformations in a ranked order based on a similarity of inputs and outputs required for said operational steps of said service being registered, and inputs and outputs of said selected service class;
   receiving, into said computerized device, selected transformations from said fourth menu for said service being registered; and
   registering said service being registered based on said selected service class, said selected class input mappings, said selected class output mappings, and said selected transformations.

2. The method according to claim 1, further comprising automatically providing an option indication field identifying ones of said operational steps, said user inputs, said selected transformation, and as being optional in said service being registered.

3. The method according to claim 1, further comprising ranking of said service class choices comprising evaluating semantic distances between said service name, said service description, and said operational steps of said service being registered and said corresponding names, descriptions, and operational steps of previously established service classes.

4. The method according to claim 1, further comprising:
   expanding previously established service classes when a service provider manually inputs said selected service class for said service being registered;
   expanding previously established class inputs when said service provider manually enters instructions to map said user inputs to internal operational outputs of said service being registered; and
   expanding previously established class transformations when said service provider manually enters transformations of said service being registered.

5. The method according to claim 1, further comprising automatically providing class descriptions when automatically providing said drop down menu of said service class choices.

6. A method of registering service operations provided by service providers, said method comprising:
   automatically providing a service registration interface to said service provider using a graphic user interface of a computerized device;
   automatically providing a service name field on said service registration interface into which said service provider inputs a service name of a service being registered,
   automatically providing a service description field on said service registration interface into which said service provider inputs a service description of said service being registered;
   automatically providing a plurality of service operation fields on said service registration interface, said service operation fields comprising a drop down menu of previously established operation choices from which said service provider chooses operational steps of said service being registered, and comprising a field into which said service provider manually inputs said operational steps of said service being registered;

ranking, using said computerized device, service class choices from previously established service classes into a first ranked order, said first ranked order being based on similarities between said service name, said service description, and said operational steps of said service being registered and corresponding names, descriptions, and operational steps of said previously established service classes;

automatically providing a service class field on said service registration interface, said service class field comprising a drop down menu of said service class choices presented in said first ranked order from which said service provider chooses a selected service class for said service being registered, and comprising a field into which said service provider manually inputs said selected service class for said service being registered;

ranking, using said computerized device, previously established class inputs into a second ranked order based on a similarly between user inputs required from users during said operational steps of said service being registered, and previously established inputs required by previously established services in said selected service class;

automatically providing a plurality of input mapping fields on said service registration interface for each of said user inputs, said input mapping fields comprising a drop down menu of said previously established class inputs to be mapped to said user inputs presented in said second ranked order from which said service provider chooses selected class input mappings, and comprising a field for manually entering said selected class input mappings;

ranking, using said computerized device, previously established class outputs into a third ranked order based on a similarly between service outputs of said service being registered produced during said operational steps, and previously established outputs produced by said previously established services in said selected service class;

automatically providing a plurality of output mapping fields on said service registration interface for each of said service outputs, said output mapping fields comprising a drop down menu of said previously established class outputs to be mapped to said service outputs of said service being registered presented in said third ranked order from which said service provider chooses selected class output mappings;

ranking, using said computerized device, previously established class transformations into a fourth ranked order based on a similarly between said service inputs and said service outputs of said service being registered, and said previously established inputs and said previously established outputs of said selected service class;

automatically providing a transformation function field on said service registration interface, said transformation function field comprising a drop down menu of said previously established class transformations in said fourth ranked order from which said service provider chooses selected transformations, and comprising a field for manually entering said selected transformations; and registering said service being registered based on said selected service class, said selected class input mappings, said selected class output mappings, and said selected transformations.

7. The method according to claim 6, further comprising automatically providing an option indication field on said service registration interface, said option indication field identifying ones of said operational steps, said user inputs, said transformation inputs, and said transformation outputs as being optional in said service being registered.

8. The method according to claim 6, said ranking of said service class choices comprising evaluating semantic distances between said service name, said service description, and said operational steps of said service being registered and said corresponding names, descriptions, and operational steps of said previously established service classes.

9. The method according to claim 6, further comprising:
expanding said previously established service classes when said service provider manually inputs said selected service class for said service being registered;
expanding said previously established class inputs when said service provider manually enters instructions to map said user inputs to internal operational outputs of said service being registered; and
expanding said previously established class transformations when said service provider manually enters transformations of said service being registered.

10. The method according to claim 6, further comprising automatically providing class descriptions when automatically providing said drop down menu of said service class choices.

11. A method of registering and maintaining service operations provided by service providers, said method comprising:
automatically providing a service registration interface to said service provider using a graphic user interface of a computerized device;
automatically providing a service name field on said service registration interface into which said service provider inputs a service name of a service being registered;
automatically providing a service description field on said service registration interface into which said service provider inputs a service description of said service being registered;
automatically providing a plurality of service operation fields on said service registration interface, said service operation fields comprising a drop down menu of previously established operation choices from which said service provider chooses operational steps of said service being registered, and comprising a field into which said service provider manually inputs said operational steps of said service being registered;
ranking, using said computerized device, service class choices from previously established service classes into a first ranked order, said first ranked order being based on similarities between said service name, said service description, and said operational steps of said service being registered and corresponding names, descriptions, and operational steps of said previously established service classes;
automatically providing a service class field on said service registration interface, said service class field comprising a drop down menu of said service class choices presented in said first ranked order from which said service provider chooses a selected service class for said service being registered, and comprising a field into which said service provider manually inputs said selected service class for said service being registered;
ranking, using said computerized device, previously established class inputs into a second ranked order based on a similarly between user inputs required from users during said operational steps of said service being registered, and previously established inputs required by previously established services in said selected service class;

automatically providing a plurality of input mapping fields on said service registration interface for each of said user inputs, said input mapping fields comprising a drop down menu of said previously established class inputs to be mapped to said user inputs presented in said second ranked order from which said service provider chooses selected class input mappings, and comprising a field for manually entering said selected class input mappings;

ranking, using said computerized device, previously established class outputs into a third ranked order based on a similarly between service outputs of said service being registered produced during said operational steps, and previously established outputs produced by said previously established services in said selected service class;

automatically providing a plurality of output mapping fields on said service registration interface for each of said service outputs, said output mapping fields comprising a drop down menu of said previously established class outputs to be mapped to said service outputs of said service being registered presented in said third ranked order from which said service provider chooses selected class output mappings;

ranking, using said computerized device, previously established class transformations into a fourth ranked order based on a similarly between said service inputs and said service outputs of said service being registered, and said previously established inputs and said previously established outputs of said selected service class;

automatically providing a transformation function field on said service registration interface, said transformation function field comprising a drop down menu of said previously established class transformations in said fourth ranked order from which said service provider chooses selected transformations, and comprising a field for manually entering said selected transformations;

registering, using said computerized device, said service being registered based on said selected service class, said selected class input mappings, said selected class output mappings, and said selected transformations;

populating, using said computerized device, a service database entry with said service name, said service description, said operational steps, said selected service class, said instructions to map inputs, said instructions to map transformation outputs, said transformation inputs, and said transformation outputs; and generating, using said computerized device, a wrapper based on said service database entry, said wrapper maintaining information from said service database entry in a format used by a business process execution engine.

12. The method according to claim 11, further comprising automatically providing an option indication field on said service registration interface, said option indication field identifying ones of said operational steps, said user inputs, said transformation inputs, and said transformation outputs as being optional in said service being registered.

13. The method according to claim 11, said ranking of said service class choices comprising evaluating semantic distances between said service name, said service description, and said operational steps of said service being registered and said corresponding names, descriptions, and operational steps of said previously established service classes.

14. The method according to claim 11, further comprising:
expanding said previously established service classes when said service provider manually inputs said selected service class for said service being registered;
expanding said previously established class inputs when said service provider manually enters instructions to map said user inputs to internal operational outputs of said service being registered; and
expanding said previously established class transformations when said service provider manually enters transformations of said service being registered.

15. The method according to claim 11, further comprising automatically providing class descriptions when automatically providing said drop down menu of said service class choices.

16. A non-transitory computer storage medium readable by a computerized device, said non-transitory computer storage medium storing instructions executable by said computerized device to perform a method of registering service operations provided by service providers, said method comprising:
receiving, into a computerized device, at least one of a service name, a service description, and operational steps of a service being registered;
automatically providing, from said computerized device, a first menu of previously established service class choices in a first ranked order based on said at least one of said service name, said service description, and said operational steps;
receiving, into said computerized device, a selected service class from said first menu for said service being registered;
automatically providing, from said computerized device, a second menu of previously established class input mappings to user inputs required for said operational steps of said service being registered, said second menu being presented in a second ranked order, based on similar input mappings of said selected service class;
receiving, into said computerized device, selected class input mappings from said second menu for said service being registered;
automatically providing, from said computerized device, a third menu of previously established class output mappings to outputs produced by said operational steps, said third menu being presented in a third ranked order, based on similar output mappings of said selected service class;
receiving, into said computerized device, selected class output mappings from said third menu for said service being registered;
automatically providing, from said computerized device, a fourth menu of previously established class transformations in a fourth ranked order based on a similarity of inputs and outputs required for said operational steps of said service being registered, and inputs and outputs of said selected service class;
receiving, into said computerized device, selected transformations from said fourth menu for said service being registered; and
registering said service being registered based on said selected service class, said selected class input mappings, said selected class output mappings, and said selected transformations.

17. The non-transitory storage device according to claim 16, said method further comprising automatically providing an option indication field on said service registration interface, said option indication field identifying ones of said operational steps, said user inputs, said transformation inputs, and said transformation outputs as being optional in said service being registered.

18. The non-transitory storage device according to claim 16, said ranking of said service class choices comprising evaluating semantic distances between said service name, said service description, and said operational steps of said service being registered and said corresponding names, descriptions, and operational steps of said previously established service classes.

19. The non-transitory storage device according to claim 16, said method further comprising:
   expanding said previously established service classes when said service provider manually inputs said selected service class for said service being registered;
   expanding said previously established class inputs when said service provider manually enters instructions to map said user inputs to internal operational outputs of said service being registered; and
   expanding said previously established class transformations when said service provider manually enters transformations of said service being registered.

20. The non-transitory storage device according to claim 16, said method further comprising automatically providing class descriptions when automatically providing said drop down menu of said service class choices.

* * * * *